United States Patent [19]

Usui et al.

[11] Patent Number: 4,790,178
[45] Date of Patent: Dec. 13, 1988

[54] INTAKE STRUCTURE OF INTERNAL COMBUSTION ENGINE WITH BYPASS INTAKE PASSAGE FOR MOUNTING AIR FLOW METER

[75] Inventors: Toshifumi Usui; Kinsaku Yamada; Tadao Osawa; Hirotoshi Kawano, all of Katsuta, Japan

[73] Assignee: Hitachi, Ltd., Tokyo, Japan

[21] Appl. No.: 92,620

[22] Filed: Sep. 3, 1987

[30] Foreign Application Priority Data

Sep. 3, 1986 [JP] Japan ................. 61-205967

[51] Int. Cl.$^4$ ................................. G01F 9/00
[52] U.S. Cl. ................................. 73/118.2
[58] Field of Search .............. 73/118.2; 403/292

[56] References Cited

U.S. PATENT DOCUMENTS

| 746,628 | 12/1903 | Field et al. .............. 403/292 X |
| 4,558,678 | 12/1985 | Nishimura et al. .......... 73/118.2 X |

FOREIGN PATENT DOCUMENTS

| 96842 | 12/1983 | European Pat. Off. . |
| 169481 | 1/1986 | European Pat. Off. . |
| 107957 | 8/1981 | Japan . |
| 570947 | 7/1945 | United Kingdom . |
| 970554 | 9/1964 | United Kingdom . |

Primary Examiner—Jerry W. Myracle
Attorney, Agent, or Firm—Antonelli, Terry & Wands

[57] ABSTRACT

An intake structure having a throttle body and an intake body connected to the upstream end of the throttle body and provided with a by-pass air passage for mounting an air flow meter. Locating construction is provided on the joint surfaces of the throttle body and the intake body so as to locate these bodies coaxially to each other.

2 Claims, 1 Drawing Sheet

INTAKE STRUCTURE OF INTERNAL COMBUSTION ENGINE WITH BYPASS INTAKE PASSAGE FOR MOUNTING AIR FLOW METER

BACKGROUND OF THE INVENTION

1. Field of the Invention

The present invention relates to an intake structure of an internal combustion engine and, more particularly, to an intake structure of the type in which a first body having an air flow sensor and a second body having a throttle valve are connected to each other so as to form an intake passage.

2. Description of the Prior Art

Japanese Unexamined Patent Publication No. 56-107957 discloses an intake structure for an internal combustion engine which is composed of a first body having an air flow sensor and a second body having a throttle valve, the first and the second body being connected to each other. More specifically, in this intake structure, one of the first and the second bodies is provided with a threaded bore, while the other is provided with a bore of a diameter which is determined to be large enough to accommodate any fluctuation in the location and diameter of the screw.

SUMMARY OF THE INVENTION

In the known intake structure of the type described above, it is difficult to coaxially connect the first body having the air flow sensor and the second body having the throttle valve. In consequence, an offset having a step is inevitably formed at the juncture between the first body and the second body so as to cause a disturbance in the flow of air flowing through the intake passage. This in turn causes a fluctuation in the pressure within the intake structure together with at the outlet side of the passage which accommodates the air flow sensor. This fluctuation in the pressure causes a fluctuation in the flow rate of air flowing through a by-pass passage. In consequence, the output from the air flow sensor, which is typically of hot-wire type, is caused to change.

Accordingly, an object of the present invention is to provide an intake structure of an internal combustion engine, which is improved to minimize the offset between the axes of the first body and the second body, i.e., to minimize the size of the step formed at the juncture between the first and the second bodies.

To this end, according to the present invention, there is provided an intake structure for an internal combustion engine comprising: a first body having therein a main passage through which intake air is introduced to the engine and a by-pass passage by-passing a portion of the main passage; a second body connected to the first body and having therein an intake passage in which is disposed a throttle valve; locating projection means provided on the joint surface of one of the first body and the second body; and locating recess means formed in the joint surface of the other of the first and second bodies, the locating projection means and the locating recess means being adapted to fit each other and being determined such that, when the locating projection means and the locating recess means fit each other, the first and second members are positioned substantially coaxially to each other.

The above and other objects, features and advantages of the present invention will become clear from the following description of the preferred embodiment when the same is read in conjunction with the accompanying drawings.

DESCRIPTION OF THE PREFERRED EMBODIMENT

A preferred embodiment of the present invention will be described hereinunder with reference to the accompanying drawings.

Figure 1:
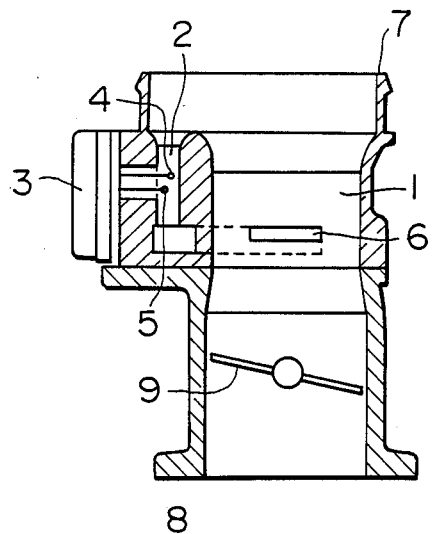
FIG. 1 is a vertical sectional view of an intake structure in accordance with the present invention.

Referring first to FIG. 1, a preferred embodiment of the intake structure in accordance with the present invention has a first body 7 which is provided therein with a main passage 1 through which intake air is introduced to an internal combustion engine and a by-pass passage 2 which by-passes a portion of the main passage 1. A hot-wire-type air flow sensor 3 is disposed in the vicinity of the by-pass passage 2. This air flow sensor 3 has a hot wire 4 and a cold wire 5 both of which are disposed in the by-pass passage 2. The intake air introduced into the body 7 is supplied to a second body 8 through the main passage 1. A portion of the intake air is supplied to the body 8 through the by-pass passage 2 and an opening 6.

The second body 8 is provided therein with an intake passage which is adapted for introducing intake air from the first body 7 into the internal combustion engine. A throttle valve 9 is mounted in this intake passage.

Figure 2:
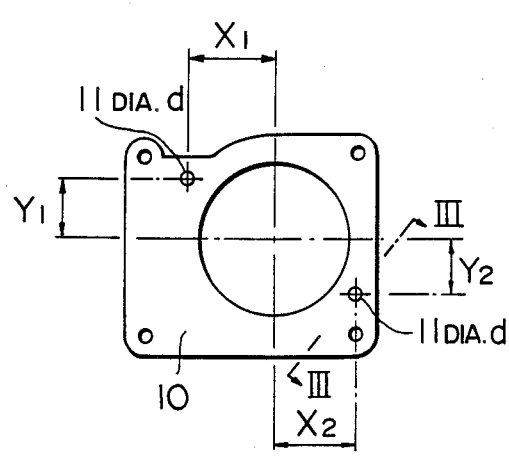
FIG. 2 is a plan view of a body 7.
Figure 3:
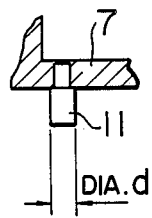
FIG. 3 is a sectional view taken along the line III—III of FIG. 2.

As shown in FIGS. 2 and 3, the joint surface 10 of the body 7 at which the body 7 contacts the joint surface 12 of the body 8 is provided with cylindrical pins 11 which tightly fit in a hole formed in this joint surface 10 of the body 7.

Figure 4:
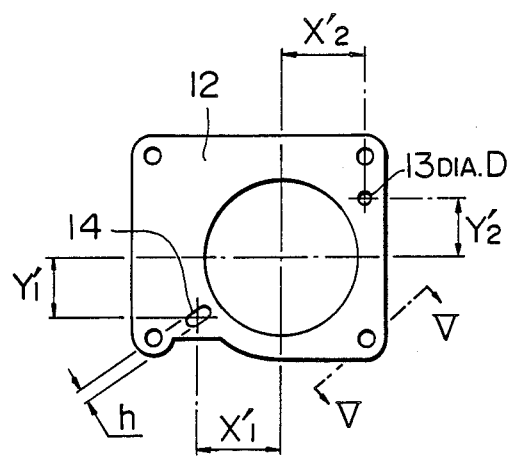
FIG. 4 is a plan view of a body 8.
Figure 5:
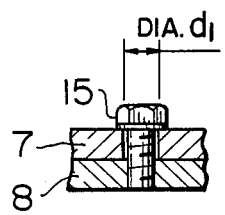
FIG. 5 is a sectional view taken along the line V—V of FIG. 4.

On the other hand, as shown in FIGS. 4 and 5, the joint surface 12 of the body 8 is provided with a circular hole 13 of diameter D and an elongated hole 14 of width h.

Various dimensions of the bodies 7 and 8 as shown in FIGS. 1 to 4 are determined to meet the following conditions.

$X_1 = X_1' Y_1 = Y_1' X_2 = X_2' Y_2 = Y_2'$ $D - d = \epsilon_1, h - d = \epsilon_2$ The symbol $\epsilon$ represents a positive value which is determined to be as small as possible but to allow movement of the bodies 7 and 8 away from each other. The tolerances in the X and Y directions also are selected to be as close as possible to zero.

For connecting the bodies 7 and 8 to each other, one of the pins 11 is press-fit into the circular hole 13 while the other pin 11 is received in the elongated hole 14. With this arrangement, it is possible to locate both bodies 7 and 8 substantially coaxially to each other by a simple operation. In consequence, no substantial step is formed at the juncture between the bodies 7 and 8, so that fluctuation in the output of the air flow sensor 3 is remarkably decreased.

As will be understood from the foregoing description, according to the present invention, a first body having an air flow sensor and a second body having a throttle valve are connected substantially coaxially to each other, without requiring any laborious work for aligning both bodies with each other. This in turn improves the accuracy of the air flow sensor, as well as the efficiency of assembly work.

Although a preferred embodiment of the present invention has been described, it is to be understood that the described embodiment is only illustrative and various changes and modifications may be imparted thereto without departing from the scope of the invention which is limited solely by the appended claims.

What is claimed is:

1. An intake structure for an internal combustion engine comprising:

a first body having therein a main passage through which intake air is introduced to said engine and a bypass passage bypass a portion of said main passage and accommodating an air flow sensor therein;

a second body connected to said first body and having therein an intake passage in which is disposed a throttle valve;

locating projection means provided on the joint surface of one of said first body and said second body; and locating recess means formed in the joint surface of the other of said first and second bodies, said locating projection means and said locating recess means being adapted to fit each other and being determined such that, when said locating projection means and said locating recess means fit each other, said first and second members are positioned substantially coaxially to each other, wherein said locating projection means includes a pair of cylindrical projections, while said locating recess means includes a cylindrical hole for engaging one of said cylindrical projections and an elongated hole for engaging the other of said cylindrical projections.

2. An intake structure according to claim 1, wherein said locating projection means includes at least one projection which is detachably secured to said joint surface of said one of said first and second members.

* * * * *